United States Patent [19]

Bissell

[11] 4,384,490

[45] May 24, 1983

[54] PRESSURE GAUGE CONSTRUCTION

[75] Inventor: Robert D. Bissell, Orange, Conn.

[73] Assignee: Dresser Industries, Inc., Dallas, Tex.

[21] Appl. No.: 256,870

[22] Filed: Apr. 24, 1981

[51] Int. Cl.³ .......................... G01L 7/04; G01L 19/14
[52] U.S. Cl. ......................................... 73/741; 73/431
[58] Field of Search ........................ 73/431, 732–743, 73/756; 29/157 R; 228/187, 175

[56] References Cited

U.S. PATENT DOCUMENTS

| 2,125,016 | 7/1938 | Gruver | 73/739 |
| 3,005,867 | 10/1961 | Green et al. | 228/187 |
| 3,388,601 | 6/1968 | Ingham | 73/738 |

Primary Examiner—Donald O. Woodiel
Attorney, Agent, or Firm—Daniel Rubin

[57] ABSTRACT

A leak-proof joint between a stainless steel gauge case and the brass socket of a pressure gauge includes a stainless steel sleeve brazed to the socket in the area of the case connection for enabling the gauge case to be welded thereto.

6 Claims, 2 Drawing Figures

PRESSURE GAUGE CONSTRUCTION

TECHNICAL FIELD

The field of art to which the invention pertains includes the art of measuring and testing as applicable to pressure gauge construction.

BACKGROUND OF THE INVENTION

Most commercial pressure gauges for general application are mass produced as relatively high production items. Processing fabrication of such gauges through the progressive production steps is normally arranged for most efficient handling in order to minimize manufacturing costs. Typically, an early production step includes attaching the inlet of a Bourdon tube sensor by means of a soft solder connection to the gauge socket. The melt temperature of the solder is on the order of about 400° F. After completing assembly of the operating components, a near final step includes mounting the outer case in place about the socket to which it is usually secured by screws. Where desired or required as for liquid filled service or the like, leak-proof joints are effected about the casing-to-socket and screw openings.

For effecting the casing-to-socket joint, it is known to utilize adhesives, elastomeric seals, etc. even though the former is characterized by less than optimum reliability while the latter is usually regarded as too costly in high production lots. Welding the joint is likewise known but is limited to constructions utilizing a socket and case of weldably compatible metals. Where possible, welding is frequently a preferred technique because of its reliability and a highly limited localized heating imposed on the surrounding structure despite the high temperatures (plus 2000° F.) which it incurs. Moreover, a welded joint thereat is generally of sufficient strength so that troublesome mounting screws and the associated sealing problems can be eliminated.

Brass sockets are commonly preferred because of the ease of soldering a Bourdon tube thereto. At the same time, stainless steel cases are desirable because of their corrosion resistance properties and good appearance. Consequently, a large quantity of such gauges are constructed of a stainless steel case and a brass socket. Stainless steel and brass are, however, not weldably compatible, although brazing thereof is theoretically possible. However, unlike welding, the high temperature (about 1200° F.) and widespread thermal conduction associated with the brazing process tends to generate more or less uniform high temperatures throughout the surrounding structure substantially higher than the melt temperature of the soft solder connection between the Bourdon tube and the socket. For that reason, brazing after having made the solder connection tends to undo or destroy the previously made solder connection while brazing before effecting the solder connection renders the production step of forming the solder connection most difficult. Despite recognition of the problem, a solution therefor has not heretofore been known.

SUMMARY OF THE INVENTION

The invention relates to pressure gauge constructions and more specifically to an improved casing-to-socket joint therefor between a case and socket of weldably incompatible metals. The joint construction in accordance with the invention results in a rigid and tight mechanical closure without need for sealants, elastomers and/or mounting screws. At the same time, fabrication of the joint is readily amenable to orderly mass production procedures without adversely affecting any previously formed soft solder connection between the Bourdon tube sensor and the socket.

In accordance with the invention, the foregoing is achieved by brazing to the socket prior to soldering the Bourdon tube connection, a sleeve or ring of metal weldably compatible with the metal case. Thereafter fabrication can proceed through the normal orderly progressive production steps until ultimately effecting the casing-to-socket connection by welding the case wall to the sleeve. Since even though welding temperatures usually exceed brazing temperatures by a considerable degree, the localized heating effect by the former in contrast to the latter will not ordinarily affect the previously soft soldered Bourdon tube connection. Consequently, the joint is effected in a simple yet effective manner to overcome the previous limitations of the prior art while enabling continuous efficient production without regard to any adverse effects on previously formed soft solder connections.

It is therefore an object of the invention to provide a novel construction for the joint connection of a pressure gauge between weldably incompatible metals of the case and socket.

It is a further object of the invention to provide a novel method for effecting the construction of the previous object.

It is a still further object of the invention to effect the previous objects in a highly economical manner as to minimize any cost burden in the mass production of such gauges.

Figure 1:
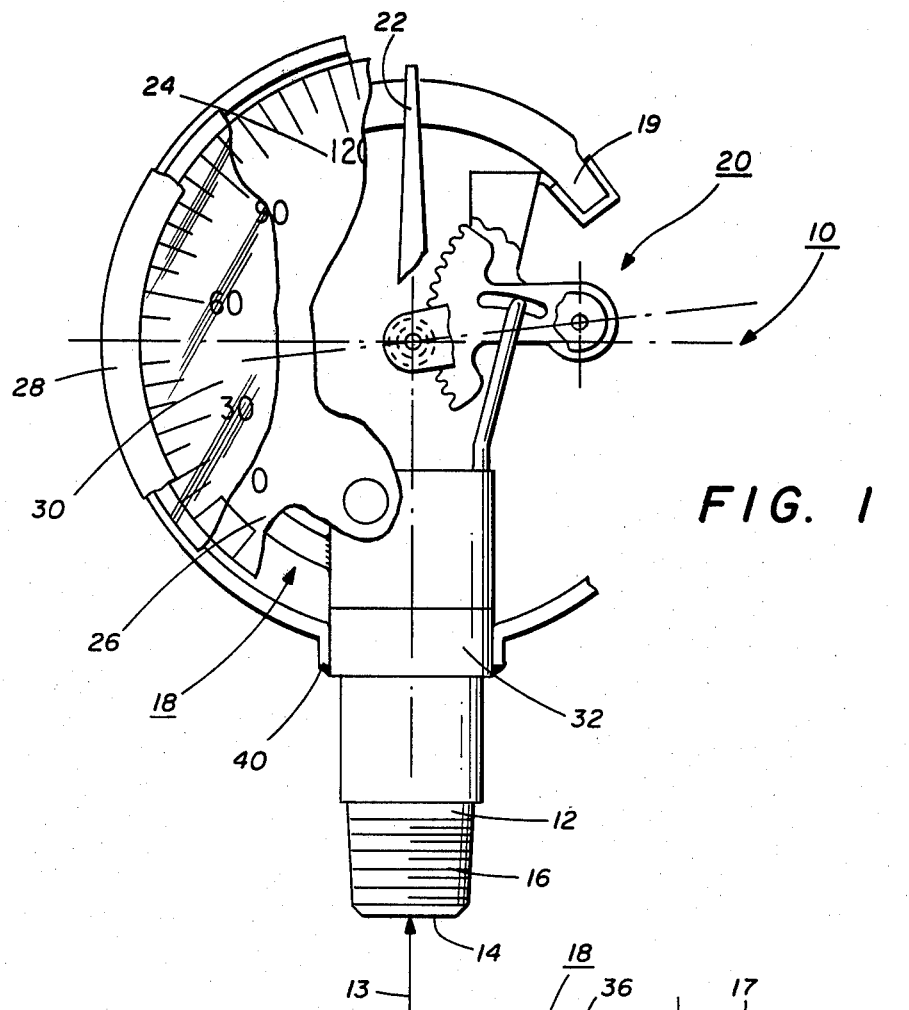
FIG. 1 is a fragmentary front elevation of a pressure gauge embodying the case-to-socket connection of the invention.
Figure 2:
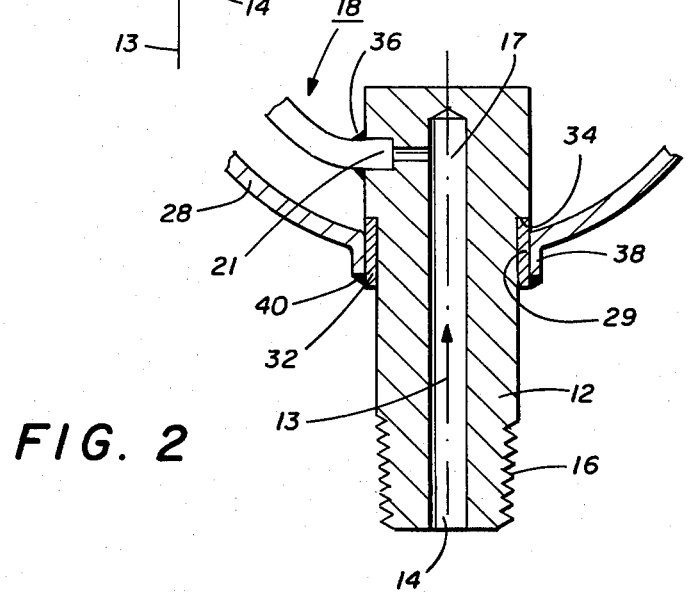
FIG. 2 is a fragmentary enlarged sectional view of the case-to-socket construction of FIG. 1.

Referring now to the drawings, a typical gauge construction designated 10 is comprised of a stem or socket 12 in which fluid pressure to be sensed, as represented by arrow 13, is received at an inlet 14. Threads 16 enable connecting the socket to a system with which the gauge is to be employed. Fluid pressure 13 is communicated inward of the socket through a bore 17 to the inlet end 21 of a Bourdon tube 18 soft solder or braze solder connected at 36 and having a free end 19. The free end of the Bourdon tube is subject to arcuate motion displacement in a well known manner in response to incremental pressure changes of fluid 13 received at inlet 14. Displacement motion of tube end 19 is conducted to amplifier 20 for producing a correlated but amplified motion operating a pointer 22 relative to pressure values 24 on dial face 26. Generally enclosing the foregoing, except for the protruding portion of socket 12, is a case 28 consisting of a cup-shaped shell-like enclosure which at its front side supports a transparent crystal 30 to enable viewing the position of pointer 22.

In accordance with the invention, case 28 is of one metal to be secured about socket 12 of a different metal with the respective metals being characterized as nonweldable to each other. Exemplifying metals typically used in such constructions are stainless steel for one and brass for the other, with the case 28 commonly being the former and socket 12 commonly being the latter. Other combinations of metals such as steel case/brass socket and monel case/brass socket are likewise commonly employed in nonweldable combination. For purposes hereof, as will be understood, case 28 has an annular turned-down flange 38 formed about socket aperture 29.

For effecting the joint of the invention, there is secured by brazing to socket 12 early in the production and prior to solder connecting Bourdon tube end 21 thereto, a ring 32 of metal weldably compatible with the metal of case 28. For the embodiment being described where case 28 is of stainless steel, ring 32 could likewise be of stainless steel or could be steel, monel, etc., and is received snugly over the inlet end of socket 12 seated against a defined shoulder 34. It is again noted in connection with the foregoing that brazing of the mentioned metals imposes a temperature on the order of about 1200° F. that extends substantially over the entire socket structure.

In a production step subsequent to brazing of ring 32 on socket 12, inlet end 21 of Bourdon tube 18 is secured to socket 12 by means of soft solder or braze solder 36. Assembly of the operating components of the gauge can then proceed in a conventional manner until eventually received loosely in case 28 with flange 38 closely surrounding ring 32. With the components in that relation, flange 38 is secured to ring 32 by annular weld 40 suitably applied as by tungsten inert gas (TIG), laser, etc. characterized by localized heating effects. In a preferred construction, ring 32 is on the order of 0.040 inches thickness in order for the weld to not adversely affect the braze thereof.

While the temperature of weld 40 would normally exceed 2000° F. as aforesaid, it is characterized as being sufficiently local to the area of application as not to adversely affect the comparably low melt temperatures solder connection 36. For purposes of the construction being described, the separation distance between weld 40 and solder connection 36 should be at least about $\frac{3}{8}$ inches.

By the above description there has been disclosed a novel method and apparatus for constructing a rigid leak-proof joint connection between a pressure gauge and a socket extending therethrough where the case and socket are of non-weldable metals. By the simple technique of utilizing a metal ring selected to be weldable to the case but previously brazed to the socket prior to effecting the Bourdon tube solder connection 36, the previous limitation with regard to forming such joints is simply and effectively overcome. At the same time the joint is effected without sacrifice in production efficiency and at an actual saving in cost compared to prior art techniques for effecting such joints. Whereas the invention has been described in a preferred environment of a pressure gauge, it is not intended to be so limited since it is recognized as having other instrument applications such as pressure switches, thermometers, etc. Even non-instrument applications are foreseen wherever similar problems exist requiring preservation of a previously formed solder connection in the vicinity of the joint.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure instrument including a tubular brass socket operative to communicate fluid pressure to inward thereof, a Bourdon tube having its inlet solder connected to said socket for receiving fluid pressure applied to said socket, output means operably connected to the output end of said Bourdon tube for displacement in response to changes in fluid pressure being applied to said socket, and a metal case of metal selected from the group consisting of steel, stainless steel and monel for enclosing the operating components of the instrument, a joint formed between said socket and an annular flange of said case wall coaxially surrounding said socket comprising a metal ring brazed to said socket about the area of said joint and characterized as being a metal weldably compatible with the metal of said surrounding case wall and a weld securing the annular flange of said surrounding case wall to said ring at a longitudinal spacing from said solder connection of at least $\frac{3}{8}$ inches.

2. In a pressure instrument including a tubular metal socket operative to communicate fluid pressure to inward thereof, a Bourdon tube having its inlet solder connected to said socket for receiving fluid pressure applied to said socket, output means operably connected to the output end of said Bourdon tube for displacement in response to changes in fluid pressure being applied to said socket, and a metal case of metal different than said socket for enclosing the operating components of the instrument, the method of forming a joint between said socket and the case wall surrounding said socket comprising the sequential steps of selecting a metal ring of metal capable of being both brazed to said socket and welded to said case wall, brazing said ring to said socket in the area of said joint prior to said Bourdon tube being solder connected to said socket, and after said Bourdon tube has been solder connected to said socket welding said surrounding case wall to said ring.

3. In a pressure instrument according to claim 2 in which said case wall surrounding said ring comprises an annular flange extending in a substantially coaxial relation about said ring.

4. In a pressure instrument according to claim 3 in which the longitudinal spacing between said weld and said solder connection is equal to at least $\frac{3}{8}$ inches.

5. In a pressure instrument according to claim 3 or 6 in which said socket comprises brass.

6. In a pressure instrument according to claim 5 in which the metal of said surrounding case wall is selected from the group consisting of steel, stainless steel and monel.

* * * * *